United States Patent [19]

Heddebaut et al.

[11] Patent Number: 5,136,225

[45] Date of Patent: Aug. 4, 1992

[54] DEVICE FOR GUIDING VEHICLES ON A VIRTUAL TRACK

[75] Inventors: Marc Heddebaut, Sainghin en Melantois; Denis Duhot, Paris; Pierre Degauque, Lambersart, all of France

[73] Assignee: GEC Alsthom SA, Paris, France

[21] Appl. No.: 810,535

[22] Filed: Dec. 19, 1991

Related U.S. Application Data

[63] Continuation of Ser. No. 509,444, Apr. 16, 1990, abandoned.

[30] Foreign Application Priority Data

Apr. 14, 1989 [FR] France ................. 89 04973

[51] Int. Cl.⁵ ............................................. G05D 1/03
[52] U.S. Cl. ......................... 318/587; 318/135; 180/168; 343/770; 246/187 C; 246/7
[58] Field of Search ......................... 318/580–587, 318/590–593, 135; 455/3, 40, 41, 100; 180/167–169; 364/424.01, 424.02; 343/18 A, 770, 6.5 R; 346/187 C, 187 B, 7; 342/351

[56] References Cited

U.S. PATENT DOCUMENTS

| | | | |
|---|---|---|---|
| 3,371,341 | 2/1968 | Stavis | 343/770 X |
| 3,629,707 | 12/1971 | Baba | 343/770 X |
| 3,775,772 | 11/1973 | Carrell | 343/770 X |
| 3,993,156 | 11/1976 | Rubel | 318/587 X |
| 4,207,569 | 6/1980 | Meyer | 246/7 X |
| 4,227,595 | 10/1980 | Hamada | 180/167 X |
| 4,232,318 | 11/1980 | Becker et al. | 246/7 X |
| 4,258,813 | 3/1981 | Rubel | 318/587 X |
| 4,307,329 | 12/1981 | Taylor | 318/587 |
| 4,310,789 | 1/1982 | Mank et al. | 318/587 |
| 4,331,959 | 5/1982 | Brauer et al. | 246/187 CX |
| 4,361,202 | 11/1982 | Minovitch | 180/168 |
| 4,472,716 | 9/1984 | Hansen | 318/587 X |
| 4,656,406 | 4/1987 | Houskamp | 180/167 X |
| 4,665,369 | 5/1987 | Faller et al. | 180/168 |
| 4,800,978 | 1/1989 | Wasa et al. | 318/587 X |
| 4,845,506 | 7/1989 | Shibata et al. | 343/770 X |
| 4,855,656 | 8/1989 | Saitoh et al. | 318/587 |
| 4,864,207 | 9/1989 | Miura et al. | 180/168 X |
| 4,910,793 | 3/1990 | Mainardi | 246/7 X |
| 4,932,617 | 6/1990 | Heddebaut et al. | 343/770 X |

FOREIGN PATENT DOCUMENTS

| | | |
|---|---|---|
| 0274055 | 7/1988 | European Pat. Off. . |
| 2445001 | 4/1976 | Fed. Rep. of Germany . |
| 2648105 | 4/1978 | Fed. Rep. of Germany . |
| 3001718 | 7/1981 | Fed. Rep. of Germany . |
| 2329008 | 5/1977 | France . |
| 1299701 | 12/1972 | United Kingdom . |

OTHER PUBLICATIONS

Patent Abstracts of Japan, vol. 9, No. 40 (P-336), under Japanese patent Application Publication No. 59180611 to Ikeda Masahiro, entitled: "Automatic Maneuvering Control Device of Unmanned Car", published Feb. 20, 1985.
Patent Abstracts of Japan, vol. 5, No. 84 (P-64) (756), Jun. 2, 1981; & JP-A-56 31109 (Hitachi) Mar. 28, 1981.
Patent Abstracts of Japan, vol. 9, No. 6 (P-326) (1729), Jan. 11, 1985; & JP-A-59 154 512 (Daifuku) Sep. 3, 1984.

*Primary Examiner*—Paul Ip
*Attorney, Agent, or Firm*—Sughrue, Mion, Zinn, Macpeak & Seas

[57] ABSTRACT

A vehicle guidance system for guiding a vehicle on a virtual track includes a waveguide connected to a member emitting electromagnetic radiation at a frequency between 1 and 100 kHz and disposed on the axis of the track to be followed. At least one set of two magnetic sensors disposed on the vehicle receive the field to determine the lateral offset of the vehicle relative to the axis of the track.

10 Claims, 2 Drawing Sheets

DEVICE FOR GUIDING VEHICLES ON A VIRTUAL TRACK

This is a continuation of application Ser. No. 07/509,444, filed Apr. 16, 1990, now abandoned.

BACKGROUND OF THE INVENTION

1. Field of the invention

The present invention concerns a system for guiding vehicles, in particular public transport vehicles, on a virtual track by means of a magnetic field generated by a field emitting device disposed on the axis of the track to be followed and comprising two magnetic sensors receiving the field disposed on the vehicle.

2. Description of the prior art

There is already known a technique for laterally guiding vehicles, in particular trolleys for conveying objects in factories, by means of a magnetic field emitted by an electrically conductive wire disposed on the axis of the track to be followed by the vehicle. The vehicle is fitted with at least one pair of coils for sensing the field generated by the wire. A technique of this kind is described in the document FR-A-2278525, for example.

There is also described in the publication Recherche Transports Sécurité, Mar. 1984, p. 45–47 a bus guidance electronic device (the so-called "Spurbus project") using the circular magnetic field generated by a cable carrying a low-frequency low-amperage current. There are disposed in the vehicle at the same height two perpendicular coils with their axis respectively horizontal and vertical connected to units for sensing phase differences between the voltages induced by the field.

Systems of this kind provide satisfactory lateral guidance of vehicles but are of no utility if it also required to monitor their speed and their position.

For this type of guidance use must be made of a radio transmission system or a system using microwave waveguides parallel to the track to be followed by the vehicle, the microwave guidance system being the subject matter of French patent application FR-A-2612715 dated Mar. 18, 1987.

This patent provided for disposing the microwave waveguide either laterally of the track to be followed or buried on its axis.

However, it was not feasible to use a microwave waveguide buried on the axis of the track to be followed to procure additionally lateral guiding of the vehicle as it could be foreseen that the accuracy of any such guidance would be very poor, the uncertainty as to the correct lateral position possibly being in the same order of magnitude at least as the width of the waveguide.

An object of the present invention is to provide a system for guiding vehicles on a virtual track which procures in addition to position and/or speed guidance accurate lateral guidance as would be necessary for public transport vehicles in particular.

SUMMARY OF THE INVENTION

In the device in accordance with the invention the field emitting member is a waveguide connected for the purpose of determining the lateral offset relative to the axis of each track to a device emitting electromagnetic radiation at a frequency between 1 and 100 kHz and preferably at around 30 kHz.

In a first embodiment of the invention the magnetic sensors are circuits tuned to the frequency of the signal emitted by the waveguide, each comprising a coil with a magnetic core, the two coils being parallel, offset with respect to each other perpendicularly to the axis of the vehicle and at the same height, with means for measuring the voltages induced across these coils.

This first embodiment preferably has at least one of the following features:

The two coils have a vertical axis.

The coils of the sensors are spaced by the width of the waveguide.

It comprises two groups of sensors disposed at different heights and means for determining from said outputs the lateral offset independently of the height of the sensors above the waveguide.

In a second embodiment of the invention one of the sensors has a vertical axis and the other has a horizontal axis, both sensors being on the axis of the vehicle and at the same height, and they are connected to a device for measuring the phase difference between the voltages induced in them.

In this second embodiment the system preferably comprises two groups of sensors at different heights and means for determining from their outputs the phase difference between the voltages induced independently of the height of the groups of sensors.

There are described hereinafter by way of example and with reference to the schematic figures of the appended drawings systems in accordance with the invention for laterally guiding a public transport road vehicle. With regard to their guidance in terms of position and speed, this is secured by providing the vehicle with microwave transmit and receive antennas and by connecting the waveguide to a microwave transmitter and receiver disposed in a traffic control post, as described in French patent application FR-A-2612715 dated Mar. 18, 1987.

To enable it to provide position and speed guidance on its path by microwave communications the structure of the waveguide will be that which is the subject matter of French patent application FR-A-2608119.

DETAILED DESCRIPTION OF THE INVENTION

Figure 1:
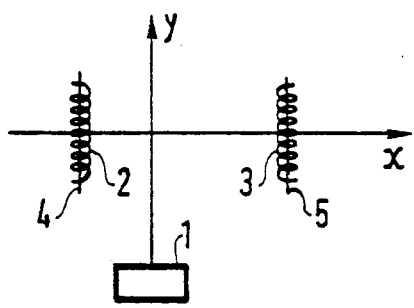
FIG. 1 shows two parallel, vertical axis measurement sensors disposed on the vehicle to be guided and the waveguide buried on the axis of the track to be followed by the vehicle, the vehicle being offset to the right of the axis of the track.

In FIG. 1 the waveguide 1 is buried on the axis of the track to be followed by the vehicle. There are provided on the vehicle to be guided two circuits tuned to the (relatively low) frequency of the radiation emitted by the waveguide. There appear in the coils 2 and 3 vertical fields $By_1$ and $By_2$ the absolute value of which depends on their horizontal offset relative to the vertical plane through the axis of the waveguides. It can be shown that a general expression for the field radiated by a very long wire carrying a current:

$$I_0 = I_0 \cos \omega t \text{ has the value } B_0 = \frac{\mu_0}{2} \frac{I}{r}$$

where $\mu_0$ is the magnetic permeability of the medium and r is the distance from the measuring point to the wire axis, the horizontal and vertical components of which have absolute values $$|Bx| = \frac{\mu_0}{2\pi} \cdot I \frac{y}{\sqrt{y^2 + x^2}}$$

y being the height of the measuring point above the wire and x and its abscissa, and $$|By| = \frac{\mu_0}{2\pi} \cdot I \frac{x}{\sqrt{y^2 + x^2}}$$

Figure 2:
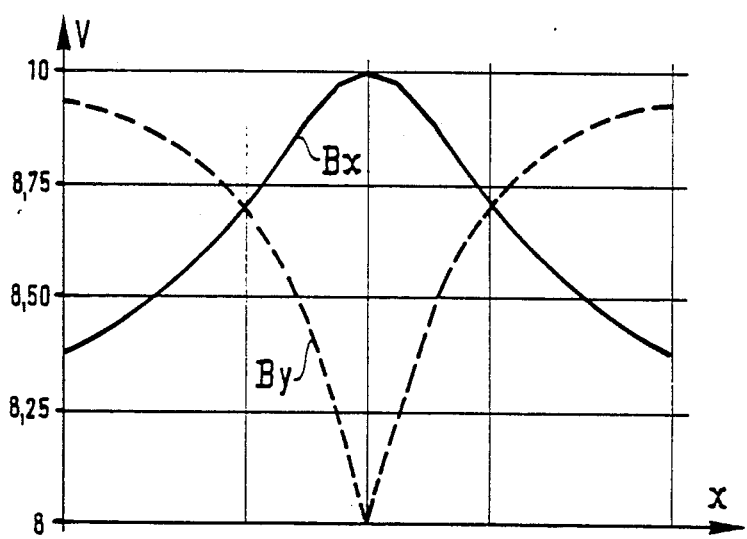
FIG. 2 shows the horizontal and vertical components of the field received by a sensor according to its position relative to the axis of the waveguide.

The amplitude of these two components of the field as a function of the horizontal abscissa of the measuring point relative to the wire, perpendicular to the latter, is shown by the curves of FIG. 2. The horizontal component is maximal and the vertical component is substantially null above the wire. It can be shown that the expression for the field as a function of the abscissa relative to the axis of the waveguide perpendicular to the latter is of the same form as above.

Figure 3:
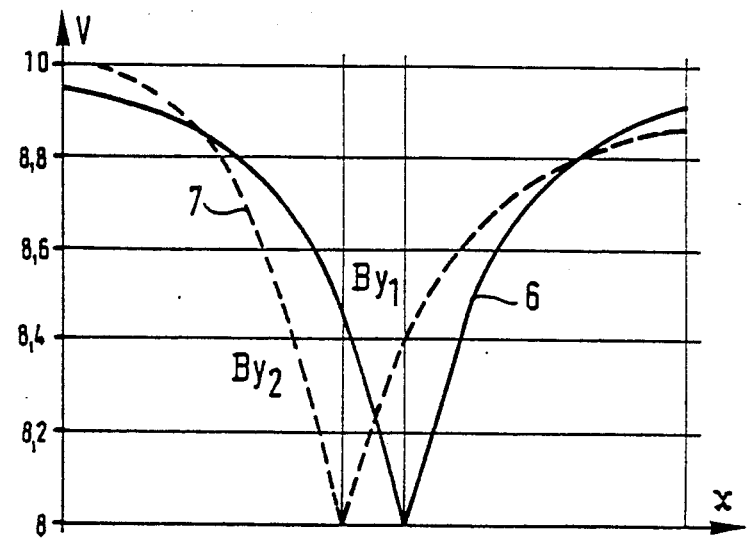
FIG. 3 shows the vertical components of the field received by two sensors disposed one on each side of the vehicle axis.

If the coils 2 and 3 with their magnetic cores 4, 5 are disposed vertically on the vehicle travelling on a track on whose axis is buried a waveguide 1 the vertical fields $By_1$ and $By_2$ induced in the coils will vary as shown by the curves 6 and 7 in FIG. 3. Observing the voltages induced across these coils therefore makes it possible to determine the lateral offset of the axis of the vehicle relative to the axis of the track.

The values of the voltages induced in the coils depends on their ordinate y above the waveguide. This dependency can be eliminated, however. Let S denote the wanted signal $$S = By^2 = K^2 \frac{x^2}{x^2 + y^2}$$

with $$K = \sqrt{\frac{\mu I}{2\pi}}$$

so that $$x = \sqrt{\frac{S}{K - S}} \, y$$

The value S therefore makes it possible to determine the value x for a given ordinate y of the coils and x is proportional to y.

Figure 4:
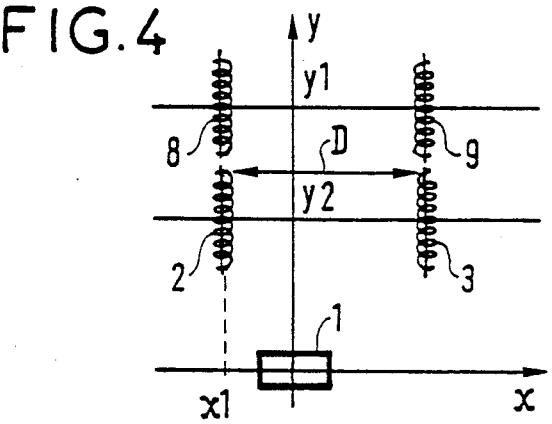
FIG. 4 shows a guidance device with two pairs of sensors at different heights whereby it is possible to obtain the offset independently of the height of the sensors above the waveguide.

In this way it is possible to determine the lateral offset x by measuring the fields $By_1$ and $By_2$ for the upper coils and the fields $By_1$ and $By_2$ for the lower coils (four fields in all) using two sets of vertical coils spaced vertically by a distance D, as shown in FIG. 4. The equations $$x_1 = K_1 Y_1$$

$$x_1 = K_2 (Y_1 + D)$$

make it possible to determine $x_1 = K_2 D/(1 - K_2/K_1)$

It is also possible to determine the lateral offset by measuring the phase difference between the field components $B_x$ and $B_y$. This method uses sensors in the form of solenoids mounted on ferrite rods tuned to the frequency at which the waveguide radiates by a parallel capacitor preferably disposed on the axis of the vehicle; one has a vertical axis and the other a horizontal axis. These sensors intergrate the magnetic field over a length L. They receive the following signals:

$$Sx = \int_{x_1}^{x_2} Bx\,dx \text{ and } Sy = \int_{y_1}^{y_2} By\,dy$$

$$Sx = \int_{x_1}^{x_2} \frac{\mu_0 I}{2\pi} \frac{y}{\sqrt{y^2 + x^2}} \cos(\omega t - k\sqrt{y^2 + x^2})\,dx$$

$$Sy = \int_{y_1}^{y_2} \frac{\mu_0 I}{2\pi} \frac{x}{\sqrt{y^2 + x^2}} \cos(\omega t - k\sqrt{y^2 + x^2})\,dy$$

The wanted signal is the phase difference between Sx and Sy.

Figure 5:
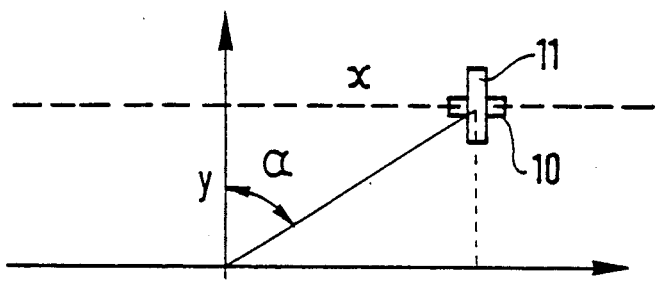
FIG. 5 shows a guidance device which measures the phase difference between the voltages induced in two coils disposed on the axis of the vehicle, one with a vertical axis and the other with a horizontal axis.
Figure 6:
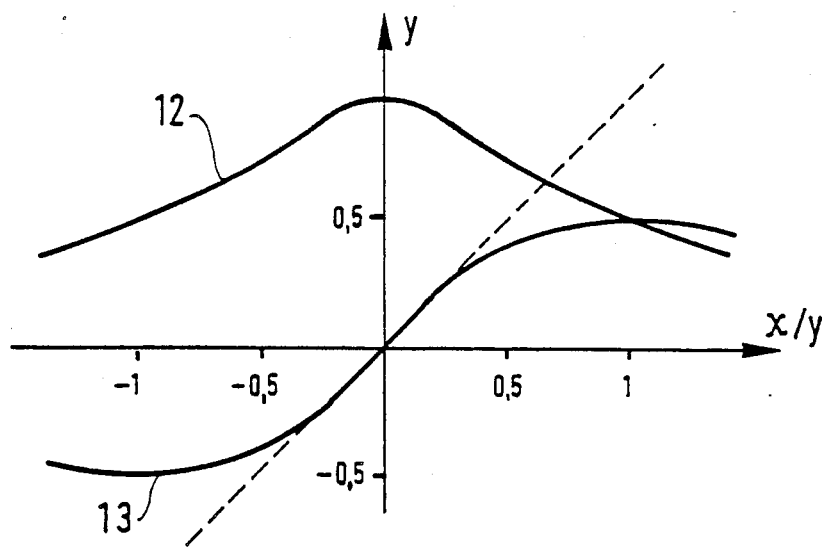
FIG. 6 shows the variation of the voltages induced in the two coils from FIG. 5 according to the ratio x/y (where y is the height of the sensors above the waveguide and x is their lateral offset relative to the axis of the waveguide).

FIG. 5 shows the measurement principle and the curves in FIG. 6 show the values of the voltages across the solenoids. $U_h$ denotes the voltage induced in the horizontal axis solenoid 10 and $U_v$ that induced in the vertical axis solenoid 11, x denotes the abscissa of the solenoid axis and y their height above the waveguide, and $\alpha$ denotes the angle with the tangent x/y; the following equations apply:

$$U_h = k \cos^2\alpha$$

$$U_v = k \cos\alpha \sin\alpha$$

$$\text{so } U_v/U_h = \tan\alpha = x/y$$

In practise the presence of the metal structure of the vehicle and possibly that of metallic armatures in the roadway introduce a non-linear character into this function.

Depending on the ratio x/y the voltages induced in the horizontal solenoid 10 and vertical solenoid 11 vary as shown by the curves 12 and 13 in FIG. 6. The phase difference, which is null when the solenoids are on the vertical axis of the waveguide, varies between $+\pi/2$ and $-\pi/2$ as it moves away to infinity on either side of this axis. Measuring the phase difference therefore makes it possible to determine the offset of the vehicle axis relative to the track axis.

Figure 7:
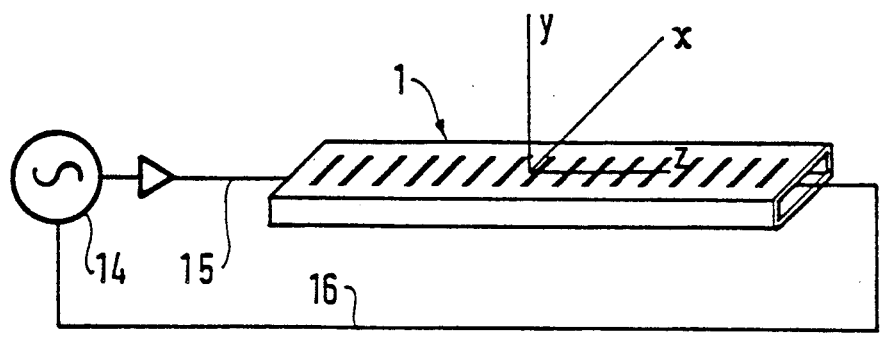
FIG. 7 shows the principle of apparatus for measuring a lateral offset relative to the axis of a waveguide.

Systems in accordance with the invention have been tested on a reduced scale experimental system shown in FIG. 7 and comprising a homogeneous rectangular waveguide 20 m long and 10 cm wide radiating through apertures in its top surface, in order to:

verify if the waveguide could be regarded as similar to a wire in respect of the field emitted and whether a system of this kind was reliable and precise, and compare the performance of relatively low frequency wire-guided type systems with waveguide systems operating at microwave frequencies.

The waveguide 1 was connected by a connection 15 to one end of a 30 kHz sinusoid generator 14 producing 10 W. The other end of the waveguide was connected to a return wire 16 forming a very slack loop, to avoid loop radiation. An earth return is equally feasible, with the end of the guide away from the generator connected to an earth terminal.

This waveguide was used for static measurements (with constant z coordinate) on an induced field $|B(x)|$ and the phase difference $\Delta\psi$ $|Bx - By|$ and dynamic measurement of B(z) and $\Delta\psi$ (z), with the x and y coordinates fixed.

The sensors used for the measurement were inductors comprising 30 turns on ferrite cores with a permeability $\mu r = 500$, diameter 1.5 cm. The resulting inductance of 0.35 mH was tuned to 30 kHz by means of an 80 nF capacitor.

An initial measurement of the signal S(x) for ordinates y = 10 cm and y = 18 cm using magnetic sensors 15 cm apart showed that the signal was directly proportional to the height above the waveguide. It is therefore possible to determine the field independently of the height of the sensors using two pairs of sensors at two different heights.

A plate was placed 1 m² above the sensors and was found to have no effect on their signals.

Dynamic measurements along the waveguide showed that the signal varied very little at low frequencies, the slots in the waveguide having no influence. The position error on the offset relative to the axis of the track is estimated at ±3 mm, a very satisfactory value in the case of vehicle guidance.

A metal bar 4 cm wide and 6 cm high was placed parallel to the guide, at a distance of 4 cm from it. The bar then radiated a field and disrupted the measurements. It is therefore necessary to avoid any metal infrastructure too close to the guide, and in particular metal members parallel to the waveguide buried in the track.

As antenna vibrations lead to signal fluctuations it will be beneficial to mount the sensors on dampers.

The phase difference between the Bx and By components was also measured with the sensors previously referred to (one with a vertical axis and the other with a horizontal axis) using 30 cm long antennas and a meter vector.

For static measurements (constant z coordinate) the phase difference varies between $-\pi/2$ and $+\pi/2$.

The sensitivity in the vicinity of a null lateral offset is respectively 1.6 degrees and 5.2 degrees for sensors at heights of 8 cm and 15 cm. The sensitivity is virtually proportional to height. It is therefore possible using two separate sets of sensors at different heights to obtain a signal conditioned only by the lateral offset.

Dynamic measurement (along the waveguide) showed that the fluctuations in the phase difference were negligible even on passing over a flange joining two waveguide sections. The error is respect of the lateral offset is in the order of 1 mm.

Negligible disruption was observed on placing a metal plate above the sensors to serve as a reflector or a metal bar parallel to and near the waveguide.

We claim:

1. In a vehicle guidance system for guiding a vehicle having a vehicle axis along a virtual track having a track axis, said system including lateral guidance means disposed on the axis of the track for emitting a magnetic field generated by an electromagnetic signal of a frequency of between 1 and 100 kHz and said vehicle comprising at least one set of magnetic sensors for sensing said magnetic field, the improvement wherein:

said means for emitting said magnetic field comprises a waveguide connected to an electromagnetic generator emitting said electromagnetic signal, said waveguide also being connected to a microwave transmitter and receiver for transmitting and receiving microwave signals for both speed and vehicle positioning monitoring, said waveguide including an upper face equipped with longitudinally spaced slots, said at least one set of magnetic sensors comprise at least two sensors disposed respectively on opposite sides of the vehicle axis, said sensors delivering output signals in response to the magnetic induction received, and calculating means connected to said at least two sensors and receiving said output signals and for processing said output signals to determine the horizontal offset of the vehicle axis with respect to the track axis and said vehicle further comprising means for transmitting and receiving said microwave signals, and wherein said at least two sensors comprise tow sets of two sensors, each set being fitted on the vehicle at a different vertical level above said waveguide, each sensor of a same set being at the same height with respect to said track and arranged to receive a magnetic induction parallel to the vehicle axis, and wherein said calculating means comprises means for determining said horizontal offset independently of the distance separating the sets of sensors from the track.

2. In a vehicle guidance system for guiding a vehicle having a vehicle axis along a virtual track having a track axis, said system including lateral guidance means disposed on the axis of the track for emitting a magnetic field generated by an electromagnetic signal of a frequency of between 1 and 100 kHz and said vehicle comprising at least one set of magnetic sensors for sensing said magnetic field, the improvement wherein:

said means for emitting said magnetic field comprises a waveguide connected to an electromagnetic generator emitting said electromagnetic signal, said waveguide also being connected to a microwave transmitter and receiver for transmitting and receiving microwave signals for both speed and vehicle positioning monitoring, said waveguide including an upper face equipped with longitudinally spaced slots, said at least one set of magnetic sensors comprise at least two sensors disposed respectively on opposite sides of the vehicle axis, said sensors delivering output signals in response to the magnetic induction received, and calculating means connected to said at least two sensors and receiving said output signals and for processing said output signals to determine the horizontal offset of the vehicle axis with respect to the track axis and said vehicle further comprising means for transmitting and receiving said microwave signals, and wherein said at least two sensors are fitted on the vehicle at the same height above said waveguide and arranged to receive the magnetic induction parallel to the vehicle axis.

3. A system according to claim 2, wherein the output signals delivered by the sensors are representative of the vertical component of the magnetic induction.

4. A system according to claim 3, wherein the sensors comprises circuits tuned to the frequency of the signal emitted by the electromagnetic generator and each sensor comprising a coil having a magnetic core.

5. A system according to claim 4, wherein the axis of the coils is vertical.

6. In a vehicle guidance system for guiding a vehicle having a vehicle axis along a virtual track having a track axis, said system including lateral guidance means disposed on the axis of the track for emitting a magnetic field generated by an electromagnetic signal of a frequency between 1 and 100 kHz and said vehicle comprising at least one set of magnetic sensors for sensing said magnetic field, the improvement wherein:

said means for emitting the magnetic field comprises a waveguide connected to an electromagnetic generator emitting said electromagnetic signal, said waveguide being further connected to a microwave transmitter and receiver used for speed and position monitoring and transmitting and receiving microwave signals and said waveguide having an upper face including a plurality of longitudinally spaced slots, said system further comprising at least one set of two sensors, the sensors of said at least one set being disposed along the vehicle axis and at the same vertical height above the waveguide and arranged such that one of said two sensors detects a component of the magnetic induction parallel to the vehicle axis and said other of said two sensors detects a component of the magnetic induction transverse to the vehicle axis, said sensors each providing an output signal, and calculating means connected to said two sensors and including means for collecting and processing said output signals for determining the horizontal offset of the vehicle axis with respect to the track axis and said vehicle further comprising means to transmit and receive said microwave signals, and wherein said at least one set of two sensors comprises two sets of sensors, said two sets being fitted on the vehicle at different vertical levels above said waveguide, and said calculating means including means for determining the horizontal offset of the vehicle axis with respect to the track axis independently of the vertical distance separating the sets of sensors from the track.

7. The system according to claim 6, wherein the sensors comprise circuits tuned to the frequency of the signal emitted by the electromagnetic generator, and wherein each sensor comprises a coil having a magnetic core.

8. The system according to claim 7, wherein the axis of the coils is vertical.

9. The system according to claim 7, wherein the output signals delivered by the sensors are representative of the vertical component of the magnetic induction.

10. The system according to claim 6, wherein the sensors comprise circuits tuned to the frequency of the signals emitted by the electromagnetic generator, and each sensor comprises a coil having a magnetic core.

* * * * *